United States Patent
Bodapati et al.

(10) Patent No.: US 10,042,880 B1
(45) Date of Patent: Aug. 7, 2018

(54) AUTOMATED IDENTIFICATION OF START-OF-READING LOCATION FOR EBOOKS

(71) Applicant: Amazon Technologies, Inc., Seattle, WA (US)

(72) Inventors: Sravan Babu Bodapati, Ponnur (IN); Venkatraman Kalyanapasupathy, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 14/989,098

(22) Filed: Jan. 6, 2016

(51) Int. Cl.
*G06F 17/30* (2006.01)
*G06F 17/27* (2006.01)
*G06N 99/00* (2010.01)

(52) U.S. Cl.
CPC ...... *G06F 17/30377* (2013.01); *G06F 17/272* (2013.01); *G06F 17/30038* (2013.01); *G06N 99/005* (2013.01)

(58) Field of Classification Search
CPC ......... G06F 17/30377; G06F 17/30038; G06F 17/272; G06N 99/005
USPC ....................................................... 707/755
See application file for complete search history.

(56) References Cited

U.S. PATENT DOCUMENTS

| | | | | |
|---|---|---|---|---|
| 5,774,580 A * | 6/1998 | Saitoh | ................ | G06K 9/00442 382/176 |
| 6,766,287 B1 * | 7/2004 | Kupiec | ................ | G06F 17/274 704/9 |
| 7,516,073 B2 * | 4/2009 | Kodama | ................ | G09B 5/06 434/309 |
| 7,565,372 B2 * | 7/2009 | Zhang | ................ | G06F 17/277 |
| 7,899,871 B1 * | 3/2011 | Kumar | ................ | H04L 51/16 709/206 |
| 8,712,850 B1 * | 4/2014 | Raghunathan | ......... | G06Q 30/00 705/14.54 |
| 8,874,731 B1 * | 10/2014 | Puppin | .............. | G06F 17/30867 707/736 |
| 9,336,185 B1 * | 5/2016 | Kumar | ................ | G06F 17/211 |
| 9,478,143 B1 * | 10/2016 | Bowen | ................ | G09B 5/06 |
| 9,697,497 B2 * | 7/2017 | Kessel | ................ | G06Q 10/10 |
| 9,727,641 B2 * | 8/2017 | Deolaikar | ......... | G06F 17/30719 |

(Continued)

OTHER PUBLICATIONS

Yu et al., "Product Title Classification versus Text Classification", Technical Report, 2012, 25 pages, retrieved from <http://www.csie.ntu.edu.tw/~cjlin/papers/title.pdf> (Year: 2012).*

(Continued)

*Primary Examiner* — Phuong Thao Cao
(74) *Attorney, Agent, or Firm* — Pierce Atwood LLP

(57) ABSTRACT

A machine-learning system analyzes electronic books to determine a "start-of-reading location" (SRL) in each book. Based on this location, when an electronic book is opened on a reading device for the first time, the book can be opened to where a reader is likely to want to start reading, automatically skipping past introductory pages. Books are divided into logical blocks (e.g., title page, forward, chapters, etc.), and a title portion and a body-text portion is identified in each block. A title classifier attempts to determine whether or not a block should be marked as the SRL. If the score from the title classifier is indefinite, a body-text classifier is used.

20 Claims, 5 Drawing Sheets

(56) References Cited

U.S. PATENT DOCUMENTS

| | | | | |
|---|---|---|---|---|
| 9,881,009 | B1* | 1/2018 | Weight | G06F 17/30011 |
| 2002/0120635 | A1* | 8/2002 | Joao | G09B 5/02 |
| 2002/0184420 | A1* | 12/2002 | Maone | G06F 13/4239 |
| | | | | 710/105 |
| 2003/0016875 | A1* | 1/2003 | Kobayashi | G06T 9/005 |
| | | | | 382/239 |
| 2005/0246410 | A1* | 11/2005 | Chen | G06F 17/30719 |
| | | | | 709/200 |
| 2006/0036596 | A1* | 2/2006 | Zhang | G06F 17/30705 |
| 2006/0206806 | A1* | 9/2006 | Han | G06F 17/30719 |
| | | | | 715/236 |
| 2007/0061356 | A1* | 3/2007 | Zhang | G06F 17/277 |
| 2007/0103741 | A1* | 5/2007 | Suzuki | H04N 1/00572 |
| | | | | 358/498 |
| 2008/0109425 | A1* | 5/2008 | Yih | G06F 17/30719 |
| 2009/0172018 | A1* | 7/2009 | Brochard | G06F 21/10 |
| 2009/0204663 | A1* | 8/2009 | Patwari | H04N 7/17318 |
| | | | | 709/203 |
| 2010/0142012 | A1* | 6/2010 | Yamamoto | G06K 9/3275 |
| | | | | 358/498 |
| 2010/0268711 | A1* | 10/2010 | Liao | G06F 17/30719 |
| | | | | 707/736 |
| 2011/0195388 | A1* | 8/2011 | Henshall | G09B 5/062 |
| | | | | 434/317 |
| 2012/0047131 | A1* | 2/2012 | Billawala | G06F 17/30696 |
| | | | | 707/723 |
| 2012/0078612 | A1* | 3/2012 | Kandekar | G06F 17/2745 |
| | | | | 704/9 |
| 2012/0197998 | A1* | 8/2012 | Kessel | G06Q 10/10 |
| | | | | 709/205 |
| 2012/0226641 | A1* | 9/2012 | Hu | G06F 17/30705 |
| | | | | 706/12 |
| 2013/0185198 | A1* | 7/2013 | Lorch | G06O 20/29 |
| | | | | 705/39 |
| 2013/0283148 | A1* | 10/2013 | Lim | G06F 17/30896 |
| | | | | 715/234 |
| 2013/0339457 | A1* | 12/2013 | Freire | G06Q 50/01 |
| | | | | 709/206 |
| 2014/0006030 | A1* | 1/2014 | Fleizach | G06F 17/30014 |
| | | | | 704/260 |
| 2014/0006308 | A1* | 1/2014 | Baggott | G06Q 30/0201 |
| | | | | 705/347 |
| 2014/0033023 | A1* | 1/2014 | Yang | G06F 17/30905 |
| | | | | 715/234 |
| 2014/0074648 | A1* | 3/2014 | Morton | G06Q 30/0631 |
| | | | | 705/26.7 |
| 2014/0281960 | A1* | 9/2014 | Bank | G06Q 10/101 |
| | | | | 715/705 |
| 2014/0324883 | A1* | 10/2014 | Deolalikar | G06F 17/30719 |
| | | | | 707/748 |
| 2015/0033116 | A1* | 1/2015 | McKinney | G06F 17/2247 |
| | | | | 715/239 |
| 2015/0074020 | A1* | 3/2015 | Arpat | G06N 99/005 |
| | | | | 706/12 |
| 2015/0139548 | A1* | 5/2015 | Vaya | G06Q 10/063112 |
| | | | | 382/187 |
| 2015/0170648 | A1* | 6/2015 | King | G06F 3/167 |
| | | | | 704/235 |
| 2015/0178266 | A1* | 6/2015 | Navrides | G06F 17/278 |
| | | | | 715/254 |
| 2015/0309987 | A1* | 10/2015 | Epstein | G06F 17/2765 |
| | | | | 704/9 |
| 2015/0339288 | A1* | 11/2015 | Baker | G06F 17/2705 |
| | | | | 704/9 |
| 2015/0346928 | A1* | 12/2015 | MacArthur | G06F 17/2229 |
| | | | | 715/776 |
| 2016/0062970 | A1* | 3/2016 | Sadkin | G06F 17/212 |
| | | | | 715/233 |
| 2016/0132477 | A1* | 5/2016 | Ghosh | G06F 17/241 |
| | | | | 715/776 |
| 2016/0283585 | A1* | 9/2016 | Zheng | G06F 17/30675 |
| 2016/0321261 | A1* | 11/2016 | Spasojevic | G06F 17/3053 |
| 2018/0012146 | A1* | 1/2018 | Arpat | G06Q 50/01 |

OTHER PUBLICATIONS

Chen et al., "Extraction of Indicative Summary Sentences from Imaged Documents", in Proceedings of the Fourth International Conference on Document Analysis and Recognition, 1997, pp. 227-232. (Year: 1997).*

Guo et al., "Segmented Document Classification: Problem and Solution", S.Bressan, J Kung, and R. Wagner (Eds.): DEXA 2006, LNCS 4080, pp. 538-548, 2006 (Year: 2006).*

* cited by examiner

AUTOMATED IDENTIFICATION OF START-OF-READING LOCATION FOR EBOOKS

BACKGROUND

When electronic books are delivered to consumer devices such as tablet computers and electronic readers ("e-readers"), a tag embedded in the book's electronic data may be used to designate a Start-of-Reading Location ("SRL"). The first time an electronic book (e-book) or similar document is opened on a device, the device can be configured to "open" the book to a location that is designated by an SRL metadata tag embedded in the e-book's data, allowing a device user to begin reading content immediately without having to flip past the title page, publisher information page, table-of-contents, forward, acknowledgements, etc. Among other things, this allows a user that has downloaded a book via a network connection to begin reading relevant content promptly after downloading, such as within seconds of having purchased the book.

Where to place an SRL "stamp" in a book is a labor-intensive process. The SRL "stamp" is the location in the e-book designated in the metadata (e.g., by a markup-language tag). While an SRL stamp might be included by a publisher, editor, or author, adding the stamp often requires having a person review the first several pages of the book in order to decide where to place the stamp. Solutions based on having a computer search by keyword or detect formatting transition to determine where to place the SRL stamp typically produce inferior results to manual review, since the diversity in writing styles and introductory content in books makes one-solution-fits-all automation solution impractical.

BRIEF DESCRIPTION OF DRAWINGS

For a more complete understanding of the present disclosure, reference is now made to the following description taken in conjunction with the accompanying drawings.

DETAILED DESCRIPTION

Configuring an unintelligent machine to make astute judgements regarding where to place an SRL stamp in an e-book or other electronic document has remained an unresolved technological problem, such that the process has remained one that is best performed by humans. In particular, when confronted with diverse source materials from different authors and publishers, complete with content and layout eccentricities, computer-based approaches have been unable to consistently determine whether a block of text-content is "relevant" to the central theme of the book and if so, how probable is it that the user will start reading the book from that location.

Crowd-sourcing where to place the SRL stamp is a possible solution, determining what page is the first relevant page based on where early readers flip to before pausing after opening the book. However, crowd-sourcing such information can be imprecise until a sufficiently large data set is accumulated, means that SRL functionality is not available to early readers, and due to privacy considerations requires that early readers of the book agree to the collection of such information.

To address these shortcomings, a machine-learning approach is disclosed in which one-or-more classifiers are trained to classify text-blocks as relevant or irrelevant. The training set used to establish ground truth comprises a large collection of existing data from manually SRL-stamped e-books, based on certain 'features.' The features were selected by analytical analysis and experimentation, to determine which features produce consistent classifier results. The machine-learning system places an SRL-stamp in a first block that likely to be relevant to a hypothetical reader of the book, when the book is first opened.

Figure 1:
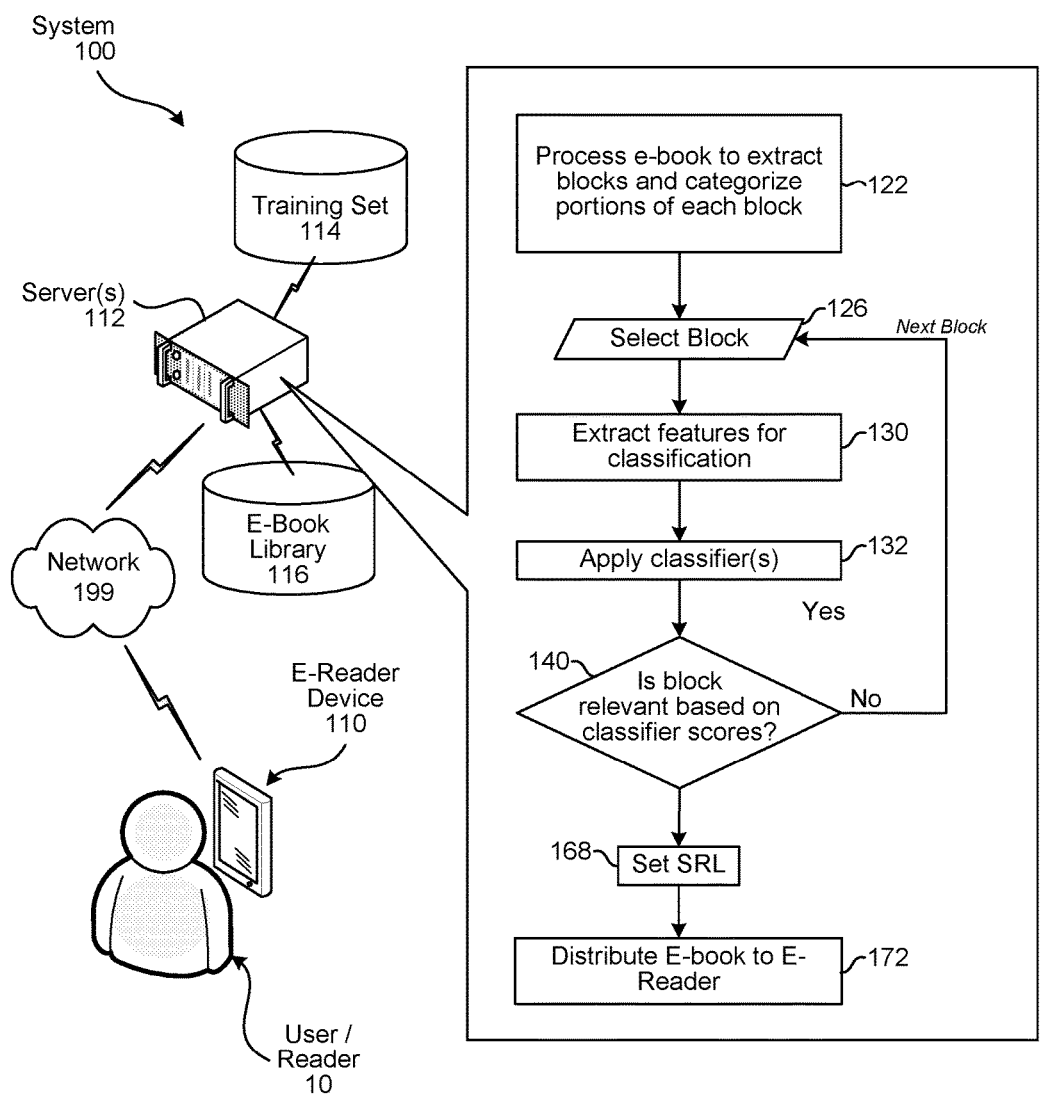
FIG. 1 illustrates a system for automated identification of start-of-reading location (SRL) for e-books.

Referring to the system 100 in FIG. 1, each e-book is processed (122) to extract blocks and categorize portions of each book. As a precursor to block extraction, if the e-book is not already formatted in a markup-language, the e-book is converted into one. Documents may be converted into a markup language such as Hypertext Markup Language (HTML), Extensible Markup Language (XML), Extensible Hypertext Markup Language (XHTML), etc. This conversion of the e-book into a markup-format is commonly performed to format a book or other document for use by e-readers. Examples of e-book formats commonly used to create and publish e-books that use markup languages include EPUB, Mobipocket, Apple's iBook format, and Amazon's Kindle KF8 format, among others. In addition, various automated tools exist for converting documents in other formats into an e-book markup-language format, such as tools to convert Microsoft Word ".doc" documents, Adobe Portable Document Format ".pdf" documents, and rich text file ".rtf" documents into an e-book markup-language format.

Once formatted in a markup-language, the e-book is processed to identify and extract individual/separate "blocks" and to categorize portions of each block. Each block corresponds to a logical entity of the book or document, such as a chapter, an acknowledgement section, etc. The blocks may be identified and extracted by parsing the mark-up language document, parsing every logical entity into an individual, separate block. The information in each block is processed to characterize portions of the information as one of "title," "body-text," or "image."

Starting with a first block, a block is selected (126) and features are extracted (130) from the block corresponding to some or all of the features that were used to train one-or-more classifiers to assign a relevance score and an irrelevance score to the selected block. The extracted features are input (132) into at least one of the trained classifiers to determine a relevance and irrelevance scores. The first "relevant" block of text corresponds to a location from which a user would likely start reading the book.

Based on the scores assigned by the classifier, a determination (140) is made as to whether the selected block is relevant based on comparing the "relevant" score to a threshold value. If it is not relevant (140 "No"), a next block is selected (126) and the classification process is repeated for the next block. If it is relevant (140 "Yes"), then the SRL stamp is assigned (168) to a start of that block. Thereafter, the e-book will be distributed (172) to an e-reader device 110 of a user/reader 10 (e.g., distributed wirelessly via a network 199), or if the book has already been distributed, data specifying which block is to be used as the SRL may be sent (e.g., via the network 199) as metadata for the book.

Figure 2:
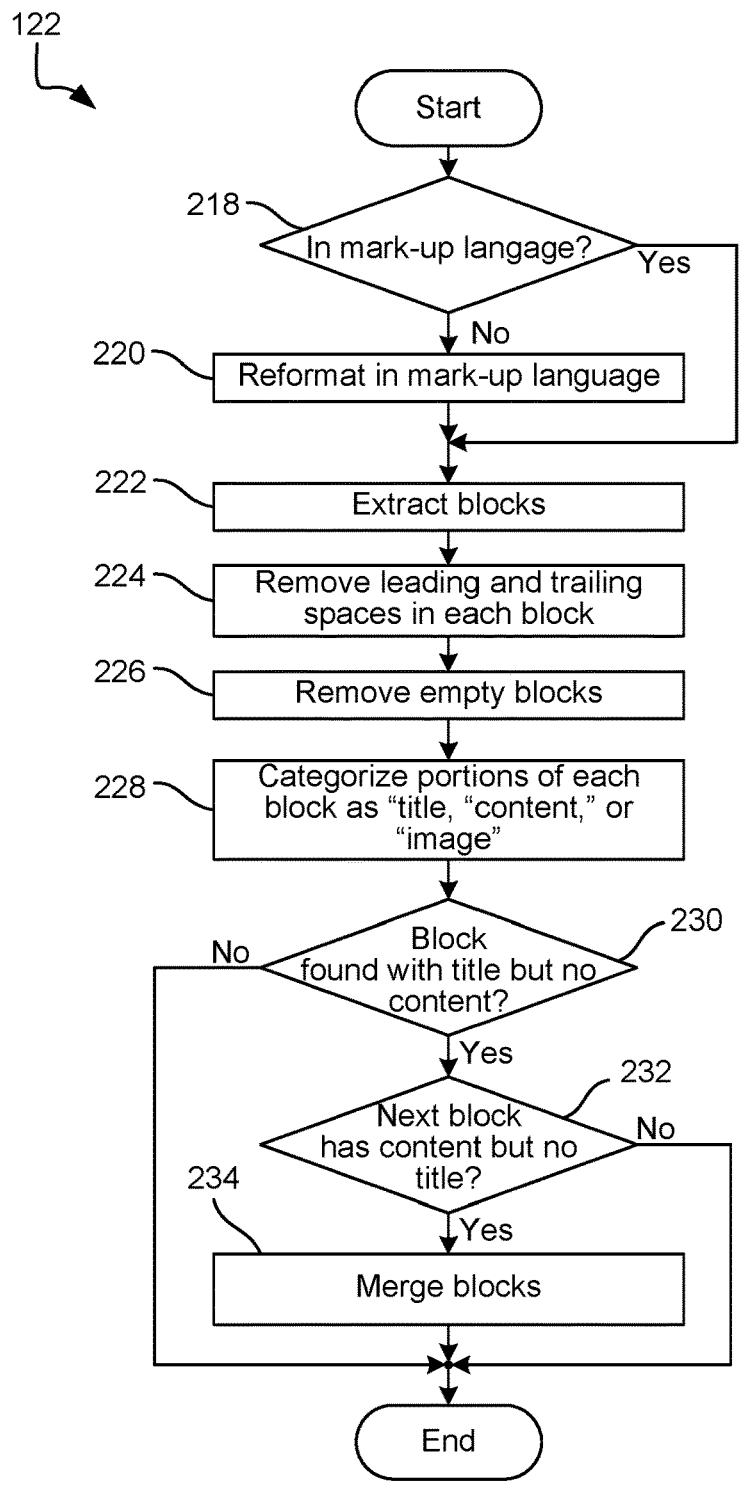
FIG. 2 illustrates an example of e-book pre-processing steps used both for training the system and for assigning SRLs to new books.

FIG. 2 illustrates examples of e-book pre-processing steps that may be included in step 122 of FIG. 1. The same process may be used to pre-process books in both the training set 114 and the e-book library 116. A determination is made (218) as to whether an e-book is or is not formatted in a mark-up language, as noted above. If an e-book is not formatted in a mark-up language or the mark-up language that the system uses (218 "No"), then it is reformatted (220) in the mark-up language used by the system. This type of conversion is commonly performed to format a book or other document for use by e-readers.

After the e-book has been parsed into a mark-up language (218 "Yes" or after 220), some or all of the book is processed to extract "blocks." Block extraction is rule-based. Mark-up language documents comprise a tree of "elements" and other "nodes." An "element" is an individual component of the document, and can have various specified "attributes." Elements can have content, including other elements and text. Elements may represent semantics or meaning, such as text that is tagged with a "title" attribute, representing the title of the document.

Most nodes have a start tag and an end tag, with the content in between, although start and end tags are not required. In languages such as HyperText Markup Language (HTML), some elements (sometimes referred to as "void elements") do not have an end tag. An example is element including a "br" tag which represents a significant line break.

Based on a set of rules, the nodes and tags are parsed to determine the start and end of each block. For example, if the document includes separate portions with top-level start and end tags, each of those portions may be treated as a separate block based on node position. Other rule criteria to differentiate between blocks include paragraph tags (e.g., "p" in HTML), document division tags (e.g., "div" in HTML), line breaks (e.g., "br" in HTML), and image files included within the document (e.g., "img" in HTML). The body-text of a block will ordinarily be marked using a "body" tag. When text is tagged as a heading, headings may be used to differentiate the start of different blocks. Tags differentiating logical entities within a book based on nesting may also be used to divide the book into blocks, such as the content between start and end tags starting with or preceded by text tagged as a heading.

Various rules may be applied as part of pre-processing. For example, leading and trailing spaces may be removed (224) from each block. Also, empty blocks can be removed (224) from the extracted blocks.

Each block is processed to categorize (228) portions of the block as title text, body-text, and images. Other attributes may also be determined, such as the title level, the title font, a list of images, and a list of text (indexed by paragraph). Titles may be identified by pre-existing tags associated with the text (e.g., by mark-up language formatter in 220 or as received from the publisher), based on transitions in font or capitalization, and/or by identifying a table of contents (if included) and comparing text strings from the table of contents with text at the beginning of each block. Images will be in an image format, and may be identified thereby. Text other than a title may be classified as "body-text." If a block is found with a title but no body-text (230 "Yes") and the following block has body-text but no title (232 "Yes"), the two blocks may be merged (234) into a single block.

Figure 3:
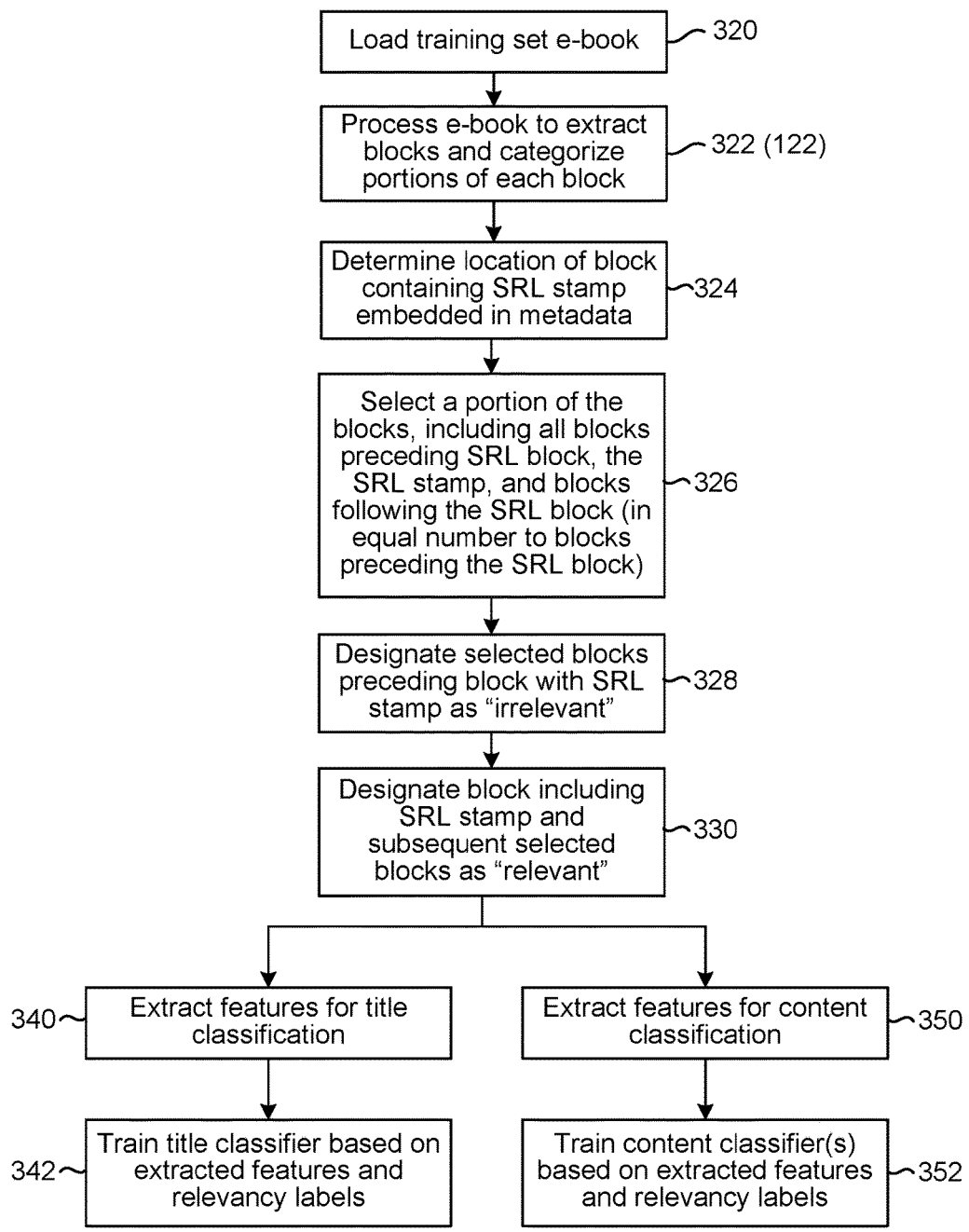
FIG. 3 illustrates a process for training the classifiers used to identify blocks of the book as being relevant or irrelevant.

FIG. 3 illustrates a process to train the classifiers. A plurality of e-books that are already in an e-book format, and which each include an SRL stamp in their metadata, are used as a training set 114. The SRL stamps in the training set may have been manually added, and/or may have been placed in a book based on analysis of crowd-sourcing data indicating the first page users flip to before pausing when initially opening the book.

Whereas building a high-confidence data set to determine where to add the SRL stamp using crowd-sourcing is ill-suited to providing SRL functionality to early buyers of new books, time sensitivity is less of a consideration when building a training set 114. In addition to using books with manually added SRL stamps, crowd-source based Start-of-Reading Location (SRL) data may be added to the training set based on years of data for an individual book distributed amongst volunteers (or user who have otherwise opted-in to allow the collection of such data). The training set 114 may be incrementally updated to include additional books as SRL data for those books becomes available. As new books are added to the training set 114, the classifiers may configured for supplemental training to refine the accuracy of the classifier score which they generate.

Books from the training set 114 are loaded (320) for training. As discussed in connection with FIG. 2, the markup-language version of each training set e-book is processed (322/122) to extract blocks and categorize portions of each block. Ordinarily, training set books will already be formatted in a mark-up language, although translation between mark-up languages may be performed, depending upon the format used by the system 100 relative to the original format.

Once the blocks have been extracted, the location of the block containing the SRL stamp is determined (324) by determining which block contains the location designated by the SRL stamp, as the SRL stamp is already embedded in the metadata of the training set book. At least a portion of the blocks are selected (326) to be designated as "relevant" or "irrelevant" based on the location of the embedded SRL stamp. For example, the selected blocks may include all of the blocks occurring before the block containing the SRL stamp, and an equal number of the blocks occurring after the block containing the SRL stamp. So if four blocks occur prior to the block containing the SRL stamp, a total of nine blocks would be selected (four before SRL, plus SRL, plus four after SRL).

Blocks that precede the block containing the SRL stamp are designated (328) as "irrelevant" (exclusive of the block containing the SRL stamp). The block including the SRL stamp, and subsequent selected blocks, are designated (330) as "relevant." The relevancy designation serves as the label used to establish ground truth for the training set 114.

Once trained, the system 100 may use an ensemble approach to identify where to place the SRL stamp, which is why more than one classifier may be trained. A first approach to identify the correct SRL block is to train a classifier to identify the relevance of a block using the "title" portion of each block. A second approach to identify the correct SRL block is to train a classifier to process the "body-text" portion of the block to identify its relevance.

For example, referring to FIG. 1, server(s) 112 of a system 100 include a first classifier and a second classifier. Using the training set 114 comprising a multitude of e-books where an SRL stamp has been manually added or added by crowdsource feedback, the first classifier is trained to identify blocks as relevant or irrelevant based on the "title" portion of each block, and the second classifier is trained to identify blocks as relevant or irrelevant based on the "body-text" portion of each block. The first classifier and the second classifier may be a single classifier or different, but in either case, the title model is trained to classify titles, such that it is different than the model or models trained to classify body-text.

The server(s) 112 used to build the classifier models may be the same or different than the server(s) that will be used to classify books needing an SRL stamp that are stored in the e-book library 116. In other words, once built from the training set 114, the classifiers models may be portable across platforms.

Training classifiers requires establishing a "ground truth." In machine learning, the term "ground truth" refers to the accuracy of a training set's classification. The relevancy designation assigned to each block, together with the "features" extracted from the block, provide ground truth for training set 114.

The training process extracts various "features" from each block and e-book, including extracting (340) "title features" for title classification and extracting (350) "body-text features" for body-text classification, which will be further described below. Features for each block are input into each classifier as a set of training examples, where each block is marked as belonging to one of two categories: relevant or irrelevant. The title classifier is trained (342) using the extracted title features for title classification and relevancy labels for blocks included in the training set 114. Likewise, the body-text classifier(s) are trained (352) using the extracted body-text features for body-text classification and relevancy labels for blocks included in the training set 114.

Each classifier's training algorithm builds a model that assigns each example into one category or the other. A classifier model may be mapped so that the examples of the separate categories are divided by a clear gap. Where the gap in the training data is not clear, model accuracy may be improved by using a large data set (e.g., SRL data from tens-of-thousands of books). Once trained, when a classifier receives features for a new block, the classifiers may issue a "score" from zero to one indicating how closely the features match "relevant" and a score from zero to one indicating how closely the features match to "irrelevant." The two scores sum to one (1). So if the probability that the features are relevant produces a score of 0.95, the probability the features are irrelevant will be 0.05. The scores are used to provide an indication of how closely the data matches the categories (relevant and irrelevant). Depending upon how classifier models are structured, the score from a classifier may be a value in a range (e.g., zero to one), where one extreme (e.g., zero) corresponds to no similarity with the category, and the other extreme (e.g., one) corresponds to perfect similarity with the category. The same model may be used to determine both the "relevance" score and the "irrelevance" score.

After training, when presented with the features of new blocks, each classifier can predict which category the new block belongs in based on a comparison of similarities between the new block and the model, categorizing the block as relevant or irrelevant based on a comparison of the relevance and irrelevance scores to threshold values to determine which side of the gap the comparison results fall on. The classifier "scores" characterize the degree of similarity. Among other things, these scores may be used to determine which side of the gap a block falls on by comparing the score to a threshold value. For example, features producing a relevance score above a threshold value of 0.85 may be deemed "relevant," and features producing an irrelevance score above a threshold value of 0.85 may be deemed "irrelevant." The score may also be used to characterize the "confidence" level of the result, based on how close the scores are to the threshold value or values defining the "gap." If a combination of two classifier models is used, such as a random forest classifier and a gradient boosting ensemble classifier for body-text classification, the body-text scores from each body-text classifier may be combined to determine the body-text scores assigned individual block. In the case of a random forest classifier, which comprises a plurality of "trees," the scores may correspond to the percentage of trees indicating that the data is relevant, and the percentage of trees indicating that the data is irrelevant.

Figure 4:
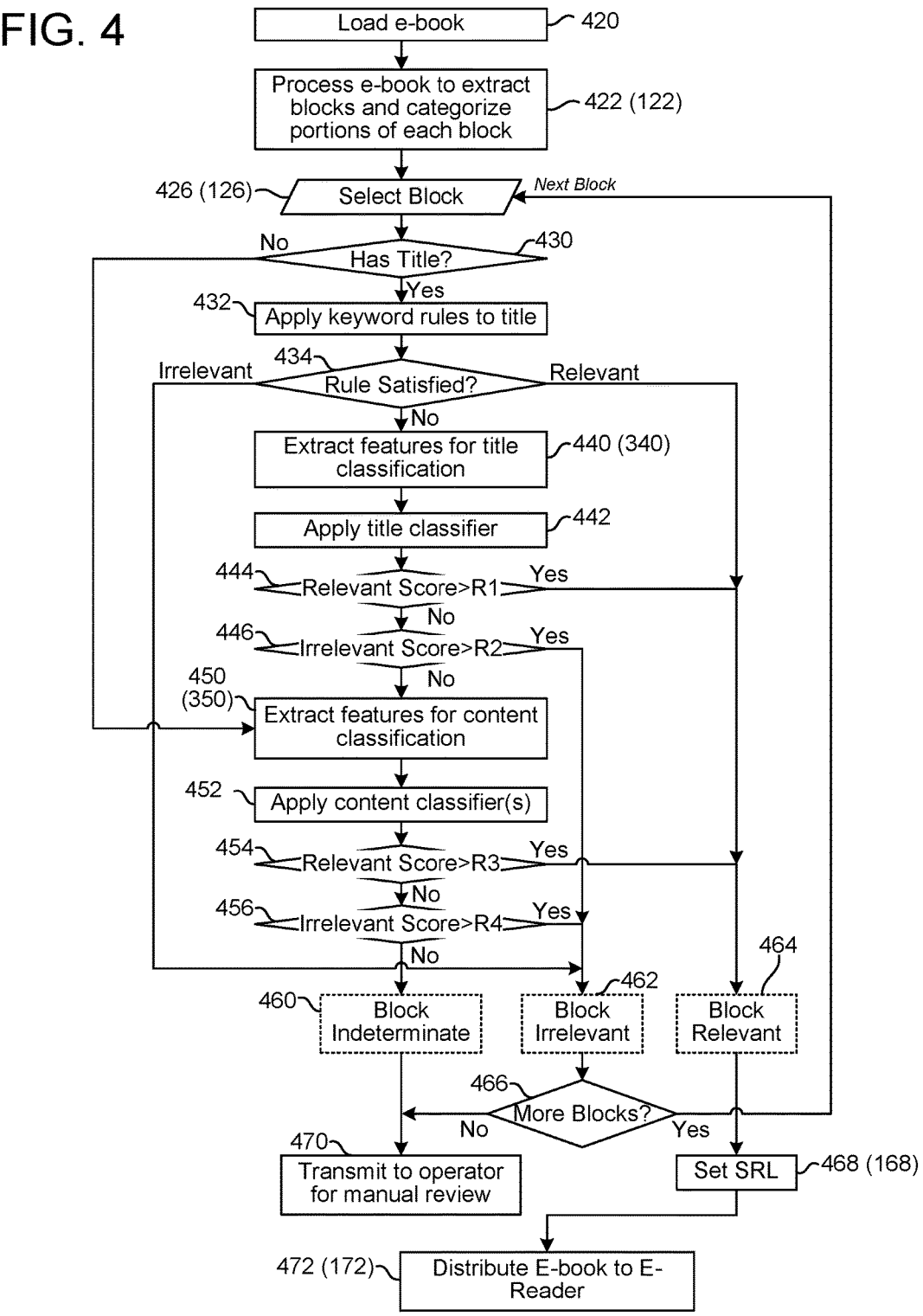
FIG. 4 illustrates a more detailed example of a process used by the system to assign an SRL to a new book.

FIG. 4 illustrates a more detailed version of the process from FIG. 1, utilizing the preprocessing from FIG. 2 and the classifiers trained in FIG. 3 to mark the first block in a book likely to be "relevant" to a hypothetical reader with the SRL stamp. A book is loaded (420) from the e-book library 116 and processed (422/122) to extract blocks and categorize portions of each block.

A first block of the new e-book is selected (426/126) for processing. A determination (430) is made as to whether the block includes a title (as sections were categorized in 228 in FIG. 2). If there is no title (430 "No"), title classification is skipped, and the process jumps to extracting features for body-text classification (450, which includes extraction of all of the features or a subset of the features used to train 350 the body-text classifier(s) in FIG. 3). Otherwise (430 "Yes"), title classification is performed.

Two layers are applied to title classification: a first rule-based layer and a second layer comprising the trained title classifier (from 342) in FIG. 3. As will be described further below, the rule-based layer checks for various keywords, and if one is found, the rules designate the block as relevant or not-relevant based on the occurrence of the keywords in the block's title or body. The second-layer title classifier may comprise, for example, a random-forest classifier utilizing (among other things) bag-of-words features as input.

Random forests are an ensemble learning method for classification, regression and other tasks, that operate by constructing a multitude of decision trees at training time and outputting the class that is the mode of the classes (classification) or mean prediction (regression) of the individual trees. Bag-of-words features are based on the multiplicity of words that appear in the title of each block.

The keywords that are applied by rule (432) in the rule-based layer represent an occurrence of a list of keywords that commonly appear in block titles. A title keyword match is used to classify the title as relevant or irrelevant. Examples of title keywords include: "prologue", "preface", "prelude", "preamble", "dedication", "presentation", "note on the Translation", "translator's note", "historical note", "welcome note", "how to use", "reviews", "about the author", "epilogue", "cast of characters", "summary", "synopsis", "abstract", "author's note", "publisher's note", "editor's note", "letter from the author", "notes on supplementary files", "epigraph", "begin reading", "acknowledgments", "acknowledgements", "glossary", "index", "reference", "introduction", and "foreword".

For example, the occurrence of blacklisted words like 'Copyright', and 'Acknowledgements', associated with sections that ordinarily occur before the SRL in a document, result in the block being treated as "irrelevant" (434 "irrelevant" resulting in 462). Likewise, the occurrence SRL-relevant keywords such as 'Chapter 1', 'Prologue', 'Introduction' result in the block being treated as relevant (434 "relevant" resulting in 464). In general, these rules classify a block as relevant or irrelevant with probability of 1, such that no further processing of the block is required to decide whether it is relevant or irrelevant.

However, if none of the keyword rules applied (432) to the block are satisfied (434 "No"), then the title classifier trained (342) in FIG. 3 is used. A plurality of title features relating to the title portion of the block are extracted (440) from the block. The extracted (440) title features may be the same features as were extracted (340) to train the title classifier in FIG. 3, or may be a subset of those features.

One example of an extracted "title feature" (340/440) of a block's title is based on a bag-of-words analysis of the training set 114. The title (as categorized in 228 in FIG. 2) of each block in the training set 114 is scanned, building a database of keywords (e.g., millions of keywords). The keywords are sorted based on frequency of occurrence, and the most frequently occurring words are selected (e.g., the top five hundred words based on their rate of occurrence). The title of each selected block is then compared against this list to produce a binary bit-array of 500 bits (also known as a "bit vector"), where a "1" indicates that the corresponding frequently-occurring-word appears in the selected title, and "0" indicates that the corresponding frequently-occurring-word is absent in the selected title. This 500 bit vector represents an extracted "bag-of-words" feature to be input into the title classifier.

Since this bit vector relies on the titles of blocks within the training set 114, when the title classifier is trained, the blocks of all books within the training set may be categorized (228 in FIG. 2) prior to extracting (340 in FIG. 3) features for title classification training, so as to use the same bag-of-words bit vector for both training (342) and classifying (FIG. 4).

Another title feature extracted (340/440) for the title classifier is whether the block appears before or after a table of contents (TOC). If the keyword rules applied (432) applied to title of the selected block found a match with the phrase "table of contents," then the table of contents is known and no further processing is necessary to determine which block corresponds to the table of contents. Otherwise, the table of contents can be identified by searching for a block that contains the text of block titles within the book. The title blocks of each block within the current book may be compared line-by-line (e.g., based on new line mark-up language codes) against the contents of a block. If the percentage of titles (e.g., 0.60 or 60%) matching lines in a block exceeds a threshold value, that block is determined to be the TOC. If a block scores below the threshold, the search advances to the next block (beginning to end) to determine whether that next block is the TOC. If no block exceeds the threshold, then the assumption is made that there is no TOC in the book.

A variety of other title features may be extracted for title classification. Example of such title features include whether any numerals appear in the title text (e.g., conventional Arabic-script numerals, Roman numerals, etc.), whether the font of the title is in bold or italics, and what percentage of letters in the title text are in a different font style. Other title features include the percentage of text in the title section of the block to appear within quotation marks, the number of words within the title, the percentage of upper and lower case letters in the title, whether the TOC block is at the beginning of the book or at the end of the book (e.g., represented as percentage of the book preceding the TOC), and whether the title of the block is contained within the table of contents.

The extracted title features are input (442) into the title classifier (trained in 342 in FIG. 3). The title classifier outputs a relevant title score and an irrelevant title score. The title scores correspond to a "confidence" level that a block is relevant or irrelevant based on the title. Threshold values are compared to the title scores to categorize the block as relevant or irrelevant. If the title score or title scores do not satisfy the threshold value(s), the block may be deemed "indeterminate," such that further analysis using the body-text classifier(s) is needed. If the title classifier outputs only a single title score, since the relevant title score and the irrelevant title score sum to one, if one title score is known, the other can be determined by subtraction.

The example in FIG. 4 uses classifier title scores corresponding to values in a range from one (e.g., highly probable) to zero (e.g., unlikely). The title classifier relevant title score is compared (444) to a first threshold "R1" (e.g., 0.85) to determine whether the title is "relevant." If the relevant title score is greater than the first threshold (444 "Yes"), then the block is deemed relevant (464), the SRL stamp is assigned (468/168) to the currently selected block, is stored with meta-data for the book in the e-book library 116, and the book (or SRL stamp meta-data, if sent after book distribution) is ready to be distributed (472/172) to an e-book reader (e.g., e-reader device 110). Although not illustrated, the relevant title score may be compared to the irrelevant title score to determine that it is more likely that the block is relevant than irrelevant. However, if the relevant title score and the irrelevant title score add to one, this ordinarily will not be necessary.

Otherwise (444 "No"), the title classifier irrelevant title score is compared (446) to a second threshold "R2" (e.g., 0.85) to determine whether the title is "irrelevant." If the irrelevant title score is greater than the second threshold (446 "Yes"), then the block is deemed irrelevant (462). The second threshold R2 may be different than the first threshold R1, or a same threshold may be used. If the block is deemed irrelevant (462), a determination (466) is made as to whether there are additional blocks left in the book to analyze. If there are (466 "Yes"), then the next block is selected (426/126), and the process repeats for the next block. Otherwise (466 "No"), if the system 100 has reached the last block of the book finding only blocks definitively categorized as "irrelevant" (i.e., without finding a single "relevant" block), the book may be transmitted (470) to an operator for manual review, or too a secondary process for collecting crowd-sourced SRL data for the book over time.

If the results of title classification are indefinite (444 "No", 446 "No"), the process transitions to body-text classification. Examples of the body-text classifier(s) trained (352) in FIG. 3 are a random forest classifier (as also used for title classification), or multiple classifiers may be used to leverage their relative strengths and weaknesses, such as using both a random forest classifier and a gradient-boosting classifier as an ensemble. Gradient boosting is a machine learning technique for regression and classification problems, which produces a prediction model in the form of an ensemble of weak prediction models, typically decision trees. Gradient boosting models are built in a stage-wise fashion, and with the models being generalized to accommodate an arbitrary differentiable loss function.

Multiple body-text features are extracted (450) from the block for body-text classification. One-or-more extracted body-text features may be based on named-entity recognition (NER). NER uses a database of people name, company names, places, and organizations to identify named-entities within documents. An example of such a database is the Stanford Named Entity library database, which is publicly accessible through the Stanford Named Entity Recognizer.

To extract (450/350) NER body-text features, an entirety of the book is scanned to identify named-entities. The named-entities are then sorted based on frequency of occurrence to create a first named-entity set for the book (e.g., a list of the top 30% to 50% of named-entities within the book). The text of the current block is then compared against the first named-entity set for the book to determine the percentage of the first set that occurs within the block. This match-percentage is then used as a feature to be input into the body-text classifier(s). The number of named entities occurring within the block that match the first set may also be used as input into the body-text classifier(s). A cosine similarity analysis may be performed to compare all of the named entities within the first set with all of the named entities within the block, with aggregate score used as an extracted NER feature.

Other NER features may be used for body-text classification, such as the number of named entities occurring in the current block. Another example feature is determining a ratio of the named entities in the block matching the first set versus the total named entities occurring within the block.

Another approach to generating body-text features based on NER that can be used in addition or as an alternative to determining the first set for the entire book is based on building a second named-entity set using a sample of named entities from the middle of the book. For example, a determination may be made as to which block corresponds to a middle of the book (rounding up or down if there are an odd number of blocks). NER is then performed on the ten blocks following the mid-point of the book to generate the second named-entity set. This second set may be used when extracting (450/350) body-text features from a selected block, such as determining a ratio of the named-entities within the second set that occur in the selected block. A cosine similarity analysis may be performed to compare all of the named entities within the second set with all of the named entities within the block, with aggregate cosine similarity score used as an extracted NER feature.

A variety of other body-text features may be extracted for body-text classification. Other body-text features include the percentage of text in the body-text section of the block to appear within quotation marks, whether the section occurs before or after the TOC block, whether the TOC block is at the beginning of the book or at the end of the book (e.g., represented as percentage of the book preceding the TOC), the number of words in the body-text section, the number of sentences in the body-text section, the average number of words per sentence, the number of images within the block, whether the title of the block is contained within the table of contents, what percentage of letters in the body-text content are in capital letters, what percentage of letters in the body-text content are lower case letters, and a percentage or ratio indicating where in the book the selected block occurs in terms of all the blocks within the book.

The body-text of the selected block may also searched to determine whether the name of the author of the book and/or the title of the book is present in the selected block, with the results being used as body-text features to be input into the body-text classifier. The author of the book and title of the book are ordinarily available as metadata associated with an e-book.

The body-text of the selected block may also be searched to compare the contents to a list of keywords and phrases associated with irrelevant blocks. Examples of such keywords include "preview", "license", "copyright", "resemblance", and "coincidental". Each keyword may be associated with a weight, where the weights are larger for keywords more likely to be occur in irrelevant passages than for words that probably—but not necessarily—indicate irrelevant passages. The list of keywords and weights may be generated by applying data mining techniques to the training set 114, comparing blocks designated "irrelevant" for purposes of ground truth across books, cross-referenced against words occurring in "relevant" blocks to eliminate common words (e.g., particles such as "the" that may frequently occur in "irrelevant" blocks, but likewise occur in "relevant" blocks as well). For example, if the keywords are weighted to be either "irrelevant" (e.g., preview, license) or "heavy irrelevant" (e.g., copyright, coincidental, resemblance), the weighted score for the block may be computed by taking the sum of the number of irrelevant keywords found in the block plus twice the number of the heavy irrelevant keywords found in the block, with the weighted score used as a body-text feature.

The extracted body-text features are then input (452) into the body-text classifier(s). The title score or scores output by the title classifier may also be input into body-text classifier, along with the extracted (450) body-text features. Although the training of the title classifier and the body-text classifier are shown in parallel in FIG. 3, if the title classifier title scores are to be input into the body-text classifier(s), then referring back to the training (352) of the body-text classifier (s) in FIG. 3, the title classifier would be trained (342) first (for the whole training set 114), so that a title classifier score can be generated for each block to be input into the body-text classifier(s) along with the extracted body-text features (350) during training (352).

If two or more body-text classifiers are used for body-text classification (e.g., a random forest classifier and a gradient-boosting classifier), the resulting body-text scores may be combined to produce ensemble body-text relevance and irrelevance scores (e.g., each ensemble score being an average of the scores from the different classifiers), with the ensemble scores being used as the body-text classification scores. Otherwise, if a single body-text classifier is used, the relevant and irrelevant body-text scores from that classifier serve as the body-text classification scores. A similar approach using ensemble classifiers might also be used for the title classifier (e.g., a random forest classifier and a gradient-boosting classifier).

The body-text classification relevant score is compared (454) to a third threshold "R3" (e.g., 0.85) to determine whether the title is "relevant." The third threshold R3 may be different than the first threshold R1 used for title classification, or a same threshold may be used. If the relevant body-text score is greater than the third threshold R3 (454 "Yes"), then the block is deemed relevant (464), the SRL stamp is assigned (468/168) to the currently selected block, is stored with meta-data for the book in the e-book library 116, and the book (or SRL stamp meta-data, if sent after book distribution) is ready to be distributed (472/172) to an e-book reader (e.g., e-reader device 110). Although not illustrated, the relevant body-text score may be compared to the irrelevant body-text score to determine that it is more likely that the block is relevant than irrelevant. However, if the relevant body-text score and the irrelevant body-text score add to one, this ordinarily will not be necessary.

Otherwise (454 "No"), the body-text classification irrelevant body-text score is compared (456) to a fourth threshold "R4" (e.g., 0.85) to determine whether the body-text is "irrelevant." The fourth threshold R4 may be different than the second threshold R2 used for title classification, or a same threshold may be used. Likewise, fourth threshold R4 may be different than the third threshold R3, or a same threshold may be used. If the body-text classification irrelevant body-text score is greater than R4 (456 "Yes"), then the block is deemed irrelevant (462). If the block is deemed irrelevant (462), a determination (466) is made as to whether there are additional blocks left in the book to analyze. If there are (466 "Yes"), then the next block is selected (426/126), and the process repeats for the next block. Otherwise (466 "No"), if the system 100 has reached the last block of the book finding only blocks definitively categorized as "irrelevant" (i.e., without finding a single "relevant" block), the book may be transmitted (470) to an operator for manual review, or too a secondary process for collecting crowd-sourced SRL data for the book over time. Also, if the body-text classifier outputs only a single body-text score, since the relevant body-text score and the irrelevant body-text score sum to one, if one body-text score is known, the other can be determined by subtraction.

If the results of body-text classification are indefinite (454 "No", 456 "No"), the block may be deemed "indeterminate" (460) and transmitted (470) to a human operator for manual review. All of the blocks in the book deemed "indeterminate" prior to finding a relevant block may be marked as "indeterminate," with the blocks up to and including the relevant block being sent to the operator's terminal marked as irrelevant, relevant, or indeterminate. After a manual review if performed to classify the indeterminate blocks, the SRL stamp is placed in the first relevant block (which might be the same as the first relevant block recognized by body-text classification, or may be one of the blocks formerly categorized as "indeterminate" prior to manual review).

A limit may be set as to how many blocks can be selected (426/126). This value may be set, for example, based on the training set 114. Statistics may be generate such as largest number of blocks in a training e-book prior-to-and-including the SRL stamp, and based on a total number of blocks in an e-book, what is the largest ratio of irrelevant blocks (those prior to the SRL stamp) to relevant blocks (from the SRL stamp onward). Other statistics include the average and median values of the block number in which the SRL stamp appears (e.g., in the third block, the fourth block, etc.) along with a standard deviation. Based on such statistics, a number of blocks for analysis may be set, adding extra "padding" blocks for good measure. For example, from a processed training set, a determination could be made that on average, the SRL stamp appears by the fourth block, with a standard deviation of one-and-one-half blocks, and the furthest into an e-book in the set before an SRL stamp appeared was nine blocks.

Figure 5:
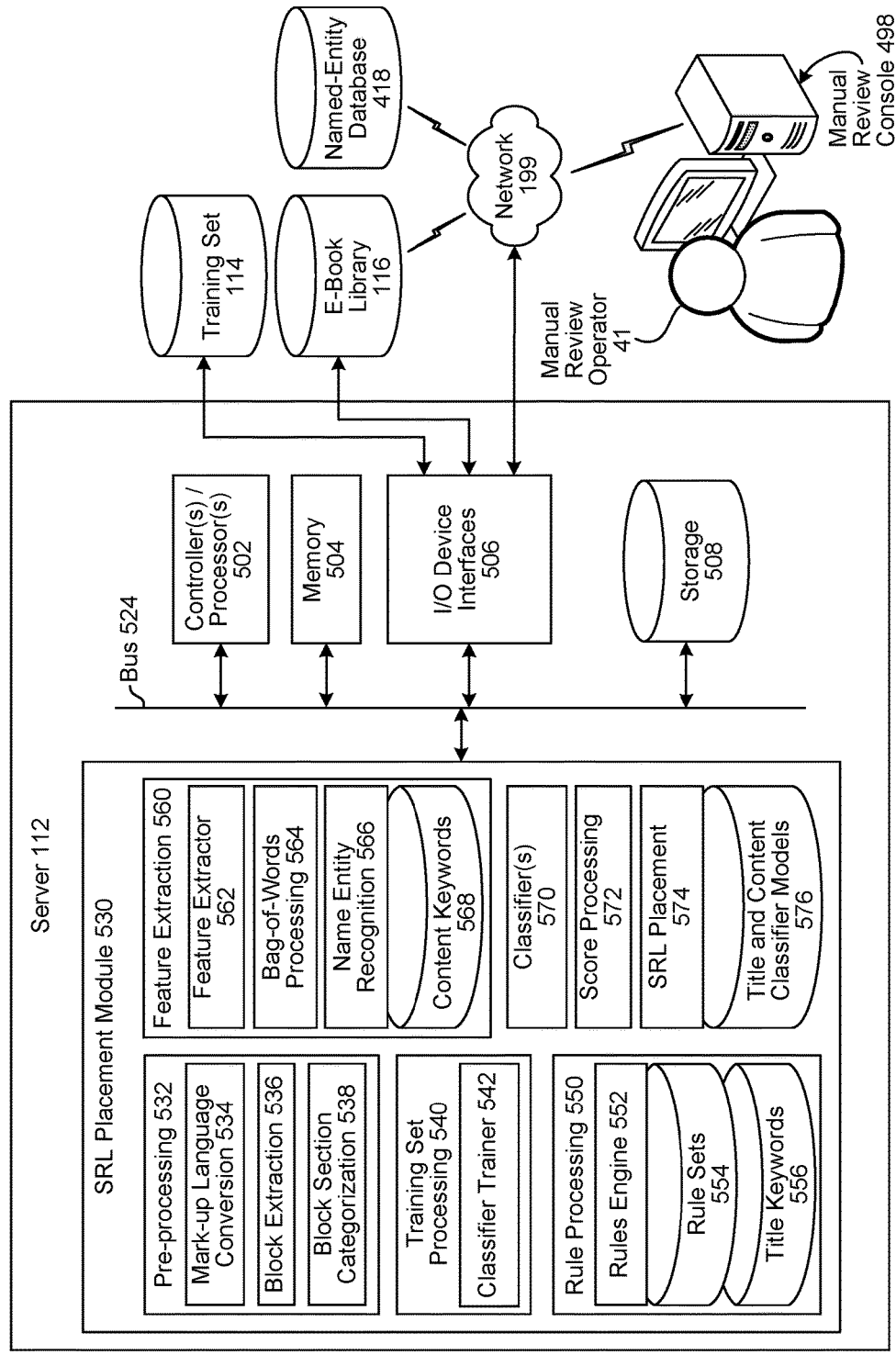
FIG. 5 is a block diagram conceptually illustrating example components of a system for assigning SRLs.

FIG. 5 is a block diagram conceptually illustrating example components of a server 112 of the system 100. The server 112 performs automated SRL placement, tagging a first block in each document that is likely to be "relevant" to a hypothetical reader upon first opening the document, in accordance with the discussion of FIGS. 1 to 4. Although the components are illustrated in a single server, components may be duplicated, distributed, and/or shared across multiple servers 112, and there may be overlap between components on different machines. Although "server" is used to facilitate easy of understanding as to how the system 100 might be set up, each "server" can be any computing system, and the hardware is not limited to computing platforms commonly thought of as "servers." In operation, the server(s) 112 may include computer-readable and computer-executable instructions that reside in non-volatile storage (e.g., storage 508), in non-volatile storage externally connected to the server(s) 112, on non-volatile media from which the instructions are loaded into the server(s) 112, etc.

The each server 112 includes one or more controllers/processors 502, that each include a central processing unit (CPU) for processing data and computer-readable instructions, and a memory 504 for storing data and instructions. The memory 504 may include volatile random access memory (RAM), non-volatile read only memory (ROM), non-volatile RAM and/or other types of memory. The each server 112 may also include a data storage component 508, for storing data and controller/processor-executable instructions (e.g., instructions to perform the processes discussed in connection with FIGS. 1-4). The data storage component 508 may include one or more non-volatile storage types such as magnetic storage, optical storage, solid-state storage, etc. Each server 112 may also be connected to removable or external non-volatile memory and/or storage (such as a removable memory card, memory key drive, networked storage, etc.) through the input/output device interfaces 506.

Computer instructions for operating the server 112 and its various components may be executed by the controller(s)/processor(s) 502, using the memory 504 as temporary "working" storage at runtime. The computer instructions may be stored in a non-transitory manner in non-volatile memory 506, storage 508, or an external device. Alternatively, some or all of the executable instructions may be embedded in hardware or firmware in addition to or instead of software.

The server 112 includes input/output device interfaces 506. A variety of components may be connected through the input/output device interfaces 506, such as the display or user terminal. The server 112 may connect to a network or networks 199, other servers 112, and to various databases and libraries (e.g., training set storage 114, e-book library 116, named-entity database 418) via the input/output device interfaces 506. The I/O device interfaces 506 may also include an interface for an external peripheral device connection such as universal serial bus (USB), FireWire, Thunderbolt or other connection protocol. The connection to one or more networks 199 may be via an Ethernet port, a wireless local area network (WLAN) (such as WiFi) radio, and/or wireless network radio.

Each server 112 may include an address/data bus 524 for conveying data among components of the server 112. Each component within the server 112 may also be directly connected to other components in addition to (or instead of) being connected to other components across the bus 524.

The server 112 further includes an SRL placement module 530 that performs the processes discussed in connection with FIGS. 1 to 4. Each component of the module 530 may comprise stored software and/or firmware instructions that are loaded and executed by the controllers/processors 502, and stored data (e.g., 554, 556, 568, 576) associated with operation of the those components. The stored data may be kept, among other places, in storage 508, in external storage, on non-volatile media that is loaded onto the server 112, etc.

A pre-processing component 532 performs the processes discussed in connection with FIG. 2 and block 122/322/422. A mark-up language conversion engine 534 reformats (220) text documents into the mark-up language used by the system (e.g., HTML), as well as reformatting documents in another mark-up language into the understood format. A conversion engine may be optimized for the system, or may one of the existing conversion engines used in e-book publishing (e.g., a Microsoft Word format to HTML converter). A block extraction engine of the pre-processing component 532 performs block extraction (222) from the mark-up language document, and a block section categorization engine 538 that categorizes (228) portions of each block.

A training set processing component 540 performs the processes discussed in connection with FIG. 3, the pre-processing component 532, feature extraction component 560, and a classifier trainer 542 to train the classifier(s) 570.

A rules processing component 550 performs the first stage of title classification as discussed in connection with FIG. 4. A rules engine 552 of the rules processing component 550 applies rules (432) from a stored rule set 554, using title keywords stored in title keyword storage 556.

A feature extraction component 560 extracts features for both the title classifier and body-text classifier(s) 570 as discussed in connection with FIGS. 1, 3, and 4. The feature extraction component 560 includes a feature extractor 562 that extracts features for each classifier, using bag-of-words processing engine 564 for bag-of-words features extracted for title classification, and a name entity recognition engine 566 for extraction of NER features used with the body-text classifier(s). Although illustrated as part of the feature extraction component 560, a separate NER engine 564 such as a cloud-based NER service may also be used. Body-text keyword storage 568 stores a list of weighted words associated with irrelevant body-text that is used to generate the score provided to the body-text classifier.

Classifier(s) 568 may include, for example, a random forest classifier and a gradient boosting ensemble classifier. A same classifier may be used for both title and body-text classification (e.g., 442, 452), utilizing different models. The models are stored in a title and body-text classifier model storage 576. Score comparisons and processing (e.g., 444, 446, 454, 456) are performed by a score processing engine 572, and the adding (168/468) of the SRL stamp to an e-book in the e-book library 116 is performed by an SRL placement engine 574. Distribution (172/472) of the e-book to an e-reader device 110 of a user 10 may be performed by the server 112 or another computing system with access to the e-book library 116.

Also illustrated in FIG. 5 is a manual review console 498 of a manual review operator 41. As discussed in connection with FIG. 4, the server may send (470) indeterminate blocks 460 to the console 498 when the ensemble classifiers are unable to classify a block preceding a first relevant block. Although the manual review operator 41 may continue to be used for creation and supplementing of the training set 114 (i.e., adding the SRL stamp manually to books in the training set), it is an objective of system 100 to minimize or entirely eliminate the need for a manual review operator 41 once the system is trained, but the review console 498 and operator 41 are illustrated for completeness.

There may be overlap in the title features extracted (340/440) for the title classifier and the body-text features extracted (350/450) by the body-text classifier, with some of the same features being used by both classifiers.

The concepts disclosed herein may be applied within a number of different devices and computer systems, including, for example, general-purpose computing systems, server-client computing systems, mainframe computing systems, laptop computers, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, natural language processing, text classifiers, and automated document annotation, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines or elements of SRL placement module 530 may be implemented as firmware or in hardware, such as the score processing engine 572. Also, one or more of the classifier(s) 570 may be implemented as an application specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    processing an electronic-book ("e-book") to extract a plurality of blocks, each block constituting a logical entity within the e-book;
    categorizing text within each block, of the plurality of blocks, as corresponding to a title or to body-text of that block;
    determining a first set of title features relating to a first title of a first block of the plurality of blocks, including features based on a bag-of-words analysis of the e-book;
    providing the first set of title features to a title classifier;
    receiving, from the title classifier, a first title score for the first set of title features;
    determining, based on the first title score, that the first block is unlikely to be where a hypothetical person reading the e-book would begin reading;
    determining a second set of title features relating to a second title of a second block of the plurality of blocks, including features based on the bag-of-words analysis of the e-book;
    providing the second set of title features to the title classifier;
    receiving, from the title classifier, a second title score for the second set of title features;
    determining, based on the second title score, that further processing is required to determine whether or not the second block is likely to be where the hypothetical person reading the e-book would begin reading;
    determining a first set of body-text features relating to first body-text of the second block of the plurality of blocks, including features based on name-entity recognition;
    providing the first set of body-text features to a body-text classifier;
    receiving, from the body-text classifier, a first body-text score for the first set of body-text features;

determining, based on the first body-text score, that the second block is likely to be where the hypothetical person reading the e-book would begin reading; and annotating metadata of the e-book with a start-of-reading location ("SRL") indicator, wherein the SRL indicator indicates, to a computing device used to access the e-book, to output the second block upon initially opening the e-book.

2. The method of claim 1, further comprising:

performing named-entity recognition on the e-book to generate a list of named entities within the e-book, and a frequency of occurrence of each of the named entities in the e-book, wherein named entities include at least names of people and place names;

ranking the named entities based on their frequency of occurrence; and selecting a first named entity based on the ranking, wherein determining the first set of body-text features further includes:

identifying occurrences of the first named entity in the body-text of the second block; and calculating a ratio of a number of occurrences of the first named entity in the body-text of the second block to a number of named entities in the list of named entities, the first set of body-text features including the ratio.

3. The method of claim 1, further comprising:

comparing words in the body-text of the second block with a list of words that indicate that the second block is likely to occur prior to the SRL, each word in the list being associated with a weight; and calculating a sum of the weight of words in the list that correspond to words occurring in the body-text of the second block, wherein the first set of body-text features includes the sum.

4. A computing system comprising:

at least one processor; and a memory including instructions operable to be executed by the at least one processor to configure the computing system to:

process a first electronic document to determine a first block and a second block, each block constituting a logical entity within the first electronic document;

categorize portions of the first block to identify a first title portion and a first body-text portion;

determine a first plurality of features from the first block, wherein the first plurality of features relate, at least in part, to the first body-text portion;

provide the first plurality of features from the first block to a first classifier, the first classifier to identify whether the first block is likely to be where a hypothetical person would begin reading the first electronic document;

determine, based on a first score output by the first classifier in response to the first plurality of features, that the first block is not likely to be where the hypothetical person would begin reading the electronic document;

categorize portions of the second block to identify a second title, a second title portion and a second body-text portion;

determine a second plurality of features from a second block, wherein the second plurality of features relate, at least in part, to the second body-text portion;

provide the second plurality of features to the first classifier;

determine, based on a second score output by the first classifier in response to the second plurality of features, that the second block is likely to be where the hypothetical person would begin reading the first electronic document; and generate data for the first electronic document to indicate a start-of-reading location to a document output device, used to access the first electronic document, to output the second block upon initially opening the first electronic document.

5. The computing system of claim 4, the memory further comprises instructions that further configure the computing system to:

determine a third plurality of features from the second block, the third plurality of features relating, at least in part, to the second title portion;

provide the third plurality of features to a second classifier, the second classifier to identify whether the second block is likely to be where the hypothetical person would begin reading the first electronic document based on the second title portion; and determine, based on a third score output by the second classifier in response to the third plurality of features, that the second block is not likely to be where the hypothetical person would begin reading the first electronic document, wherein the third score is determined prior to the second plurality of features being provided to the first classifier.

6. The computing system of claim 5, the memory further comprises instructions that further configure the computing system to:

process each document in a training set of documents to determine training blocks, each training block constituting a logical entity within the training set;

categorize a portion of each training block as being a title portion of the training block;

determine a frequency of occurrence of each words appearing in title portions of the training blocks;

rank the words based on their frequency of occurrence; and select a set of the words based on their ranking, wherein the instructions to determine the third plurality of features further configure the computing device to:

determine which of the words in the set occur in the second title portion and which of the words in the set do not occur in the second title portion, wherein the third plurality of features include an indication of how many of the words in the set do occur in the second title portion, and how many of the words in the set do not occur in the second title portion.

7. The computing system of claim 5, the memory further comprises instructions that further configure the computing system to:

process each document in a set of documents to determine training blocks, wherein metadata for each document in the set includes an annotation indicating from where the document should be opened upon initially opening the respective document;

categorize portions of each training block, categories for the portions including a title portion and a body-text portion;

train the first classifier to classify each of the training blocks based on body-text portions of the training blocks; and train the second classifier to classify each of the training blocks based on title portions of the training blocks, wherein the first and second classifiers are trained to classify training blocks occurring before where the metadata indicates the document should be opened as being not likely to be where the hypothetical person would begin reading the document, and trained to classify training blocks including and occurring after where the metadata indicates the document should be opened as being likely to be where the hypothetical person would begin reading the document.

8. The computing system of claim 5, the memory further comprises instructions that further configure the computing system to:
prior to providing the third plurality of features from the second block to the second classifier, to:
compare words in the second title portion of the second block with a first list of words, an occurrence of which indicates that the second block is likely to occur prior to a block from which the hypothetical person would be likely to begin reading the first electronic document;
determine that none of the words in the second title portion correspond to words in the first list;
compare the words in the second title portion of the second block with a second list of words, an occurrence of which indicates that the hypothetical person would be likely to begin reading the first electronic document at the second block; and
determine that none of the words in the second title portion of the second block correspond to words in the second list.

9. The computing system of claim 4, the memory further comprises instructions that further configure the computing system to:
perform named-entity recognition on the first electronic document to generate a list of named entities within the first electronic document, together with a frequency of occurrence of each of the named entities in the first electronic document;
rank the named entities based on their frequency of occurrence; and
select a first named entity based on the ranking,
wherein the instructions to determine the second plurality of features from the second block include instructions to further configure the at least one processor to:
identify occurrences of the first named entity in the second body-text portion of the second block; and
calculate a ratio of a number of occurrences of the first named entity in the second body-text portion to a number of named entities in the list of named entities, the second plurality of features including the ratio.

10. The computing system of claim 9, wherein the second plurality of features further comprises one or more of:
a first number of capital letters in the second body-text portion;
a second number of small letters in the second body-text portion;
a third number of words in the second body-text portion;
a fourth number of sentences in the second body-text portion;
a fifth number of lines in the second body-text portion;
whether a name of an author of the first electronic document appears in the second body-text portion; and
whether a document title of the first electronic document appears in the second body-text portion.

11. The computing system of claim 4, the memory further comprises instructions to determine the first plurality of features from the first block to further configure the computing system to:

compare words in the first body-text portion of the first block with a first list of words corresponding to words whose occurrence indicates that the first block is likely to occur prior to a block from which the hypothetical person is likely to begin reading the first electronic document, each word in the first list being associated with a weight; and
calculate a sum based on the weight of words in the first list that correspond to words in the first body-text portion of the first block,
wherein the first plurality of features includes the sum.

12. The computing system of claim 4, the memory further comprises instructions that further configure the computing system to:
provide the second plurality of features from the second block to a second classifier, the first classifier and the second classifier using different classifier models,
wherein the instructions to determine that the second block is likely to be where the hypothetical person would begin reading the first electronic document further base the determination on a third score output by the second classifier in response to the second plurality of features.

13. A method comprising:
processing a first electronic document to determine a first block and a second block, each block constituting a logical entity within the first electronic document;
categorizing portions of the first block to identify a first title portion and a first body-text portion;
determining a first plurality of features from the first block, wherein the first plurality of features relate, at least in part, to the first body-text portion;
providing the first plurality of features from the first block to a first classifier, the first classifier to identify whether the first block is likely to be where a hypothetical person would begin reading the first electronic document;
determining, based on a first score output by the first classifier in response to the first plurality of features, that the first block is not likely to be where the hypothetical person would begin reading the electronic document;
categorizing portions of the second block to identify a second title, a second title portion and a second body-text portion;
determining a second plurality of features from a second block, wherein the second plurality of features relate, at least in part, to the second body-text portion;
providing the second plurality of features to the first classifier;
determining, based on a second score output by the first classifier in response to the second plurality of features, that the second block is likely to be where the hypothetical person would begin reading the first electronic document; and
generating data for the first electronic document to indicate a start-of-reading location to a document output device, used to access the first electronic document, to output the second block upon initially opening the first electronic document.

14. The method of claim 13, further comprising:
determining a third plurality of features from the second block, the third plurality of features relating, at least in part, to the second title portion;
providing the third plurality of features to a second classifier, the second classifier to identify whether the second block is likely to be where the hypothetical person would begin reading the first electronic document based on the second title portion; and determining, based on a third score output by the second classifier in response to the third plurality of features, that the second block is not likely to be where the hypothetical person would begin reading the first electronic document, wherein the third score is determined prior to the second plurality of features being provided to the first classifier.

15. The method of claim 14, further comprising:

processing each document in a training set of documents to determine training blocks, each training block constituting a logical entity within the training set;

categorizing a portion of each training block as being a title portion of the training block;

determining a frequency of occurrence of each words appearing in title portions of the training blocks;

ranking the words based on their frequency of occurrence; and selecting a set of the words based on their ranking, wherein determining the third plurality of features further comprises:

determining which of the words in the set occur in the second title portion and which of the words in the set do not occur in the second title portion, wherein the third plurality of features include an indication of how many of the words in the set do occur in the second title portion, and how many of the words in the set do not occur in the second title portion.

16. The method of claim 14, further comprising:

processing each document in a set of documents to determine training blocks, wherein metadata for each document in the set includes an annotation indicating from where the document should be opened upon initially opening the respective document;

categorizing portions of each training block, categories for the portions including a title portion and a body-text portion;

training the first classifier to classify each of the training blocks based on body-text portions of the training blocks; and training the second classifier to classify each of the training blocks based on title portions of the training blocks, wherein the first and second classifiers are trained to classify training blocks occurring before where the metadata indicates the document should be opened as being not likely to be where the hypothetical person would begin reading the document, and trained to classify training blocks including and occurring after where the metadata indicates the document should be opened as being likely to be where the hypothetical person would begin reading the document.

17. The method of claim 14, further comprising:

prior to providing the third plurality of features from the second block to the second classifier, to:

comparing words in the second title portion of the second block with a first list of words, an occurrence of which indicates that the second block is likely to occur prior to a block from which the hypothetical person would be likely to begin reading the first electronic document;

determining that none of the words in the second title portion correspond to words in the first list;

comparing the words in the second title portion of the second block with a second list of words, an occurrence of which indicates that the hypothetical person would be likely to begin reading the first electronic document at the second block; and determining that none of the words in the second title portion of the second block correspond to words in the second list.

18. The method of claim 14, further comprising:

performing named-entity recognition on the first electronic document to generate a list of named entities within the first electronic document, together with a frequency of occurrence of each of the named entities in the first electronic document;

ranking the named entities based on their frequency of occurrence; and selecting a first named entity based on the ranking, wherein determining the second plurality of features from the second block further comprises:

identifying occurrences of the first named entity in the second body-text portion of the second block; and calculating a ratio of a number of occurrences of the first named entity in the second body-text portion to a number of named entities in the list of named entities, the second plurality of features including the ratio.

19. The method of claim 18, wherein the second plurality of features further comprises one or more of:

a first number of capital letters in the second body-text portion;

a second number of small letters in the second body-text portion;

a third number of words in the second body-text portion;

a fourth number of sentences in the second body-text portion;

a fifth number of lines in the second body-text portion;

whether a name of an author of the first electronic document appears in the second body-text portion; and whether a document title of the first electronic document appears in the second body-text portion.

20. The method of claim 14, wherein determining the first plurality of features from the first block further comprises:

comparing words in the first body-text portion of the first block with a first list of words corresponding to words whose occurrence indicates that the first block is likely to occur prior to a block from which the hypothetical person is likely to begin reading the first electronic document, each word in the first list being associated with a weight; and calculating a sum based on the weight of words in the first list that correspond to words in the first body-text portion of the first block, wherein the first plurality of features includes the sum.

* * * * *